Jan. 18, 1955 N. B. WALES, JR 2,700,150

MEANS FOR MANUFACTURING MAGNETIC MEMORY ARRAYS

Filed Oct. 5, 1953 3 Sheets-Sheet 1

INVENTOR.

Nathaniel B. Wales Jr.

Jan. 18, 1955 N. B. WALES, JR 2,700,150

MEANS FOR MANUFACTURING MAGNETIC MEMORY ARRAYS

Filed Oct. 5, 1953 3 Sheets-Sheet 2

INVENTOR.

Nathaniel B. Wales Jr.

Jan. 18, 1955 N. B. WALES, JR 2,700,150

MEANS FOR MANUFACTURING MAGNETIC MEMORY ARRAYS

Filed Oct. 5, 1953 3 Sheets-Sheet 3

INVENTOR.

Nathaniel B. Wales Jr

United States Patent Office 2,700,150

Patented Jan. 18, 1955

2,700,150

MEANS FOR MANUFACTURING MAGNETIC MEMORY ARRAYS

Nathaniel B. Wales, Jr., Morristown, N. J., assignor to Industrial Patent Corporation, New York, N. Y.

Application October 5, 1953, Serial No. 384,009

3 Claims. (Cl. 340—174)

This invention relates to a device and means for applying the technique of printed circuits to the rapid manufacture of digital binary magnetic memory arrays.

These arrays are well known in the art, and have the form of a square lattice of magnetic rings made of a material whose magnetic B-H plot is substantially rectangular, so that there are two well-defined extremes of magnetiza tion for representation of the two values (1, 0) necessary to memorize binary numbers. Each row and each column of these arrays are provided with electronic gates or switches, each capable of sending a current pulse through a conductor which passes through each of the magnetic rings lying in its particular row or column. The common return circuit for the row conductors is so connected to the common return circuit for the column conductors, that when a current pulse of appropriate polarity is simultaneously applied to a particular row and column, the magnetic ring lying at the address defined by this row and column is linked by what is equivalent to a two turn coil wound on this magnetic toroidal ring and carrying the current of the coincident pulses. As a result of the rings in the array, only the selected one lying at the given address is adequately magnetized to "remember" the selected pulse polarity.

In order to read out information previously memorized by the array, a third conductive circuit is provided which threads all of the magnetic rings (preferably diagonally) so that if there is substantial rate of change of magnetic flux in any of the members of the array, a voltage will be induced in this output circuit. This, to read out the information as to whether the memory cell lying at $x$, $y$ is in the "plus" state or "minus" state, the $x$ and $y$ conductors are positively pulsed. If the specified cell was in the plus state, the applied pulses will not appreciably change the magnetic flux linking the diagonal output circuit, and no appreciable voltage will appear in this circuit. However, if the given cell was in the minus state, the applied pulses will flip this magnetic toroid through a relatively large flux change thereby giving rise to a voltage pulse in the common output circuit which is interpreted to mean that the interrogated cell had been in the minus state.

The utility of the before-described system lies in the use of a very large number of such toroidal magnetic memory cells, all appropriately threaded with the required conductors. Consequently, the manufacture of arrays containing, for instance, 10,000 such units involves a slow and expensively laborious manual weaving operation.

The present invention overcomes this obstacle to speedy and cheap manufacture of magnetic memory arrays by providing a novel arrangement of printed conductive areas on a perforated insulating plate which, in conjunction with a group of U-shaped wires moulded in an insulating plastic plug, permits the linking of the miniature magnetic toroids in the required memory circuit without any weaving or threading operations.

The method of manufacture using the foregoing components consists in first, the insertion of the plastic plugs bearing the U-shaped wires into the central aperture of the toroid, second, the insertion of the projecting ends of the U-shaped wires of these sub-assemblies into the corresponding holes of the insulating support plate, and third, the dipping of the side of the foregoing plate opposite the toroids into a bath of molten solder so as to draw the solder by capillary action up the annular space between the ends of the U-shaped wires and the holes in said plate, so as to bond the said wires to the conductive printed areas on the plate.

An object of my invention is to provide a simple means whereby magnetic memory arrays may be manufactured without weaving or threading operations.

A second object is to provide a cheap method for securing and connecting magnetic memory rings to a supporting connection plate.

A third object is to disclose a design which permits the manufacture of magnetic memory arrays by automatic machinery.

Other objects are implicit in the specification and claims.

Figure 1:
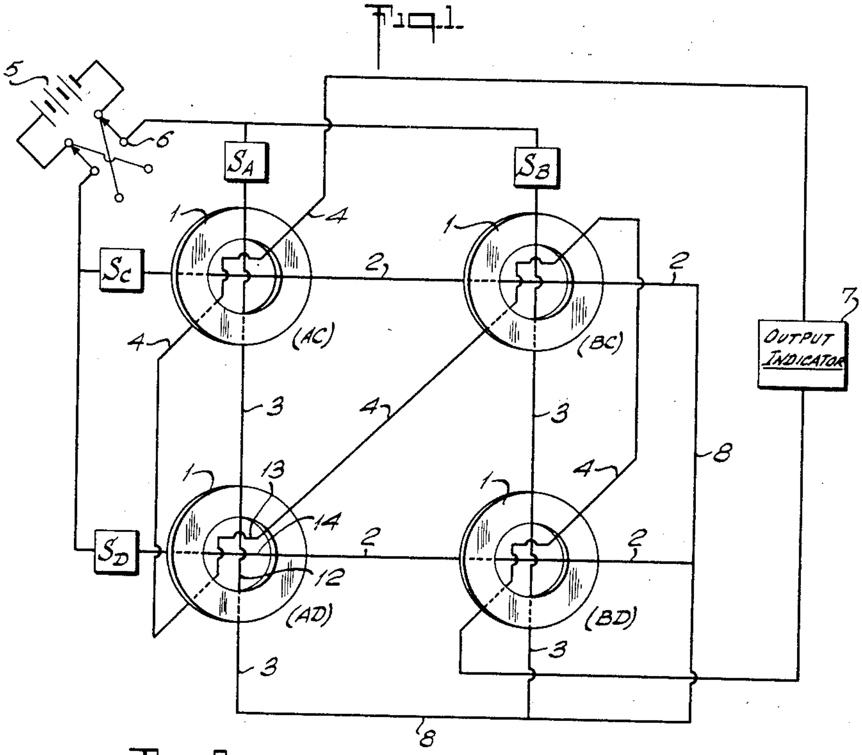
Fig. 1 is the schematic diagram of an illustrative magnetic memory array circuit.

Referring to the drawings, Fig. 1 is the schematic diagram of a characteristic magnetic memory array as herebefore described. Numeral 1 represents one of the magnetic toroids having a rectangular hysteresis loop. Conductors 2 form the row connections and each may be seen to thread each toroid in its row. Conductors 3 form the column connections and each threads each toroid in its column. One end of each row conductor 2 and of each column conductor 3 connects to the common return connection 8. Output conductor may be seen to thread each toroid of the array. Although this is shown to be accomplished by a diagonal path in Fig. 1, it makes no difference to the operation of the system in what order this conductor threads the array, as long as each toroid is threaded, and consequently, a path of threading parallel to either the rows or columns would operate equally well.

The switches or gates $S_A$ and $S_B$ serve to connect column A or column B respectively to the lead 9, while switches or gates $S_C$ and $S_D$ connect row C or row D respectively to lead 10, when closed.

Leads 9 and 10 are connected to the two pole two throw reversing switch 6 which schematically illustrates a means for pulsing a given column and row with a selected polarity of potential provided by battery 5. The portion of conductors 2 lying within and immediately adjacent to each toroid is designated 14. Similarly, the corresponding portions of conductors 3 and 4 is designated 12 and 13 respectively.

A typical operation of this circuit would comprise the closure of switches $S_A$ and $S_D$ and the subsequent throwing of switch 6 to the position shown. This will result in a "positive" pulse traversing the course 6, 9, $S_A$, 3, 8, 2, $S_D$, 10, 6, and 5. The only toroid which this current path links in such a manner as to receive a two-turn linkage with this pulse is ring AD. The foregoing process constitutes the reading-in, or recording, of a memory bit into the address AD. For reading-out this memory, the address AD is again positively pulsed. Since the magnetic structure of toroid AD is already magnetized in the positive sense, only a low order voltage will be induced in the common linking output circuit 4, and this is interpreted by the voltage responsive indicator 7 to represent this fact. Had AD originally been magnetized negatively, on the other hand, the positive interrogation pulse would have resulted in a substantial voltage appearing at 7 thereby so indicating. This well-known circuit is described only to show that there is a basic geometric wiring requirement for the use of such memory arrays, namely, that at least three conductors must symmetrically pass through the orifice of each closed magnetic ring. The present invention teaches that the threading operations usually employed to manufacture such an array may be obviated by using an insulating support surface on which a "printed" pattern of multiple isolated conductive areas has been secured, in conjunction with a group of at least three U-shaped mutually insulated and supported conductors for each ring to bridge the gaps between said conductive areas so as to form the desired circuit linkages of Fig. 1.

Figure 2:
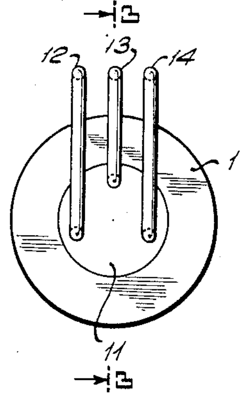
Fig. 2 is the plan view of a single magnetic memory toroid assembled to the insulating plastic plug and its three U-shaped conductors.
Figure 3:
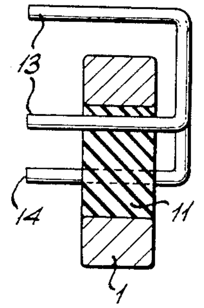
Fig. 3 is a section through 3—3 of Fig. 2.
Figure 7:
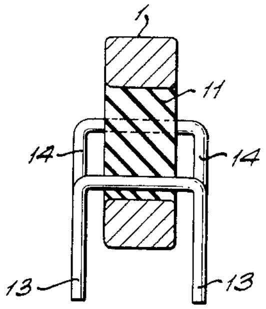
Fig. 7 is the section through 7—7 of Fig. 8.

Figs. 2 and 3 are enlarged views of one magnetic ring 1 assembled onto an insulating plug 11 into which are moulded the three U-shaped wires or conductors 12, 13, and 14. It is intended that the moulding and assembly of these parts shall be done by automatic machinery. The terminal plane for the U conductors of Figs. 2 and 3 lies parallel to one face of the magnetic toroids 1. An alternative form of this subassembly is shown in Figs. 7 and 8 in which the terminal plane of the U conductors 12, 13, and 14 lies parallel to the axis of the ring.

Figure 4:
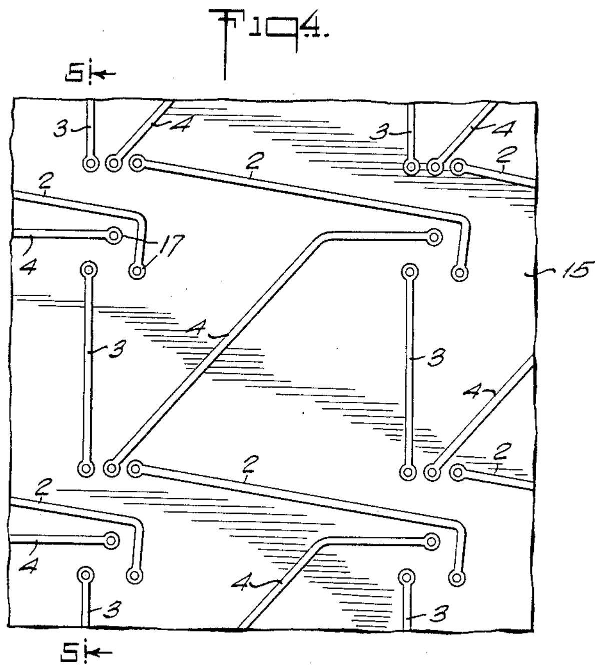
Fig. 4 is the fragmentary plan view of a portion of the printed circuit which accomplishes the objectives of my invention.

The fragmentary plan view of Fig. 4 shows one suitable pattern of "printed" conductive surfaces bonded to the perforated insulating plate 15 capable of effecting the array circuit of Fig. 1.

The broad term "printed" is used to describe any of the methods for deposing a multiple predetermined pattern of conductive areas familiar to those skilled in the art. These include spraying metal through a stencil mask, photographic electrodeposition methods, painting a metal solution through a mask and firing on a ceramic base, and the use of a laminated insulator-metal sandwich which may be subsequently etched by acid into the desired pattern.

Figure 8:
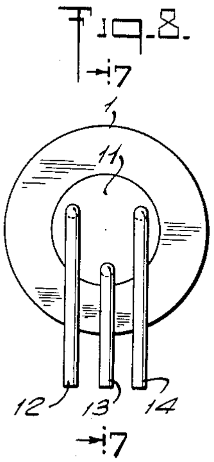
Fig. 8 is the plan view of an alternative construction to that of Fig. 3.

In Fig. 4 the perforations 17 in insulating plate 15 are arranged in groups to match the terminal position of the U conductors 12, 13, 14 of Figs. 2 and 8. The conductive areas 2 secured to plate 15 are positioned to interconnect the inside end of the U conductor 14 (Fig. 2) of one toroid 1 with the outside end of U conductor 14 belonging to the adjacent toroid in the same row. Similarly, conductive areas 3 secured to plate 15 are positioned to interconnect the inside end of the U conductor 12 (Fig. 2) of one toroid with the outside end of the U conductor 12 belonging to the adjacent toroid in the same column. Finally, conductive areas 4 secured to plate 15 are positioned to interconnect the inside end of U conductor 13 (Fig. 2) of one toroid with the outside end of U conductor 13 belonging to the diagonally adjacent toroid. Fig. 4 shows the foregoing plate 15 and areas 2, 3 and 4 before addition of the assemblies of Figs. 2 and 3 or 7 and 8.

In the case of the modification shown in Figs. 7 and 8, the foregoing description simply substitutes the terms "obverse" and "reverse" for the terms "inside" and "outside."

Figure 5:
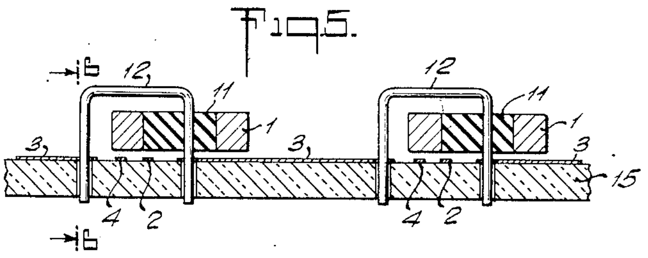
Fig. 5 is a transverse section through 5—5 of Fig. 4 but showing, in addition, two assembled torroids mounted on the plate.

Fig. 5 shows the completed assembly in section. At the section taken it may be seen how the composite conductive path 3—12—3—12—3 threads one column of magnetic rings 1. This view also shows the perforations 17 in plate 15 into which the U-shaped conductors 12 are inserted.

Figure 6:
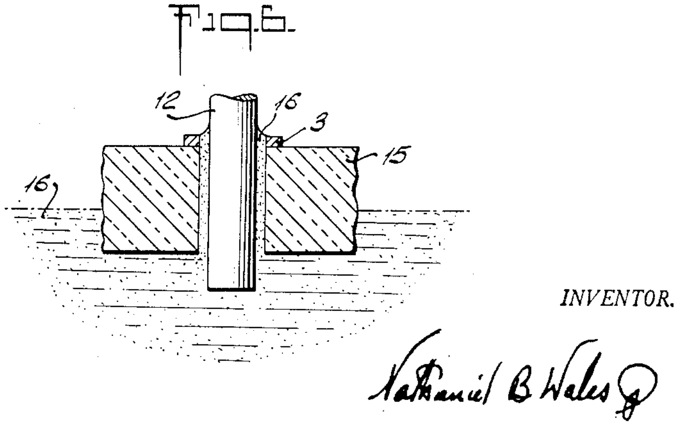
Fig. 6 is an enlarged section of a fragment of 6—6 of Fig. 5 showing the capilliary action of the solder during manufacture.

The enlarged view of Fig. 6 illustrates the step in the method of manufacture of my invention where the support plate 15 is dipped into a bath of molten solder 16 to the level indicated, whereby capillary action in the annular clearance space between hole 17 and wire 12 draws the fluid solder upward above the bath level so as to form a bond between wire 12 and the metallic conductive area of the printed circuit member 3.

Figure 9:
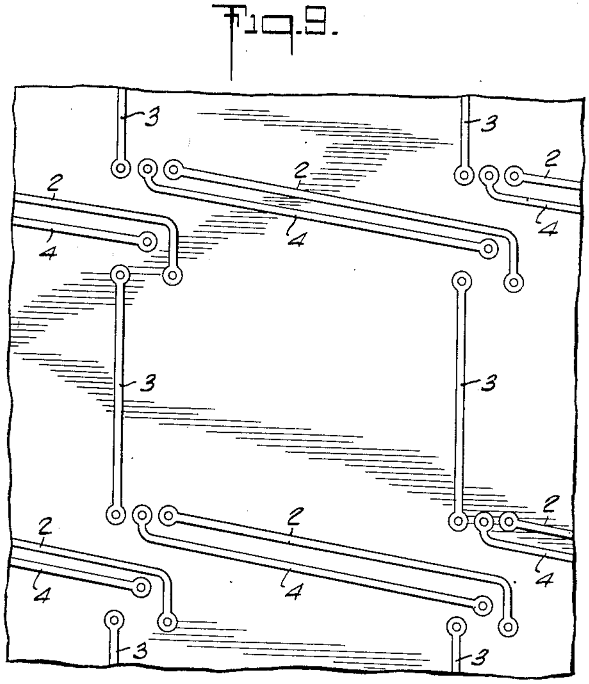
Fig. 9 is an alternative arrangement of the output circuit printed conductive areas.

Fig. 9 discloses an alternative pattern of the output conductive areas 4 on plate 15 which will satisfy the circuit requirements previously set forth. In this case the output circuit elements 4 run parallel to either a column or row lead instead of the diagonal arrangement shown in Fig. 4.

What I desire to protect by United States Letters Patent is encompassed in the following claims:

1. In a magnetic memory device, the combination comprising a first plurality of magnetic ring cores, an insulating support surface, a second plurality of U-shaped electrical conductors for each said magnetic ring core, means to secure the ends of said U-shaped conductors to said insulating surface whereby each closed path comprising one said conductor and the line joining the points of said securance of said conductor to said surface encircles the closed magnetic circuit of one of said ring cores, and a third plurality of non-contiguous electrically conducting areas secured to and lying on said insulating surface whereby to connect said U-shaped conductors into a number of series circuits equal to said second plurality.

2. In a magnetic memory device, the combination comprising an insulating support plate, a rectangular array of magnetic ring cores lying on one side of said support plate, a plurality of U-shaped conductors for each of said ring cores, each said U conductor being positioned so as to pass in sequence through a hole piercing said plate through the central hole of said ring core thence around the outside of said ring core and again into a second hole piercing said support plate, and a plurality of conducting non-contiguous areas lying on and secured to the surface of said support plate on the same side occupied by said ring cores whereby to permit molten solder exposed to the side of said plate remote from said cores to be carried by capillary action up said piercing holes for bonding said U conductors to said conducting areas.

3. In a magnetic memory device, the combination comprising an insulating sheet, a series of perforations piercing said sheet, a plurality of electrically conductive strips secured to said sheet and each extending between a pair of said perforations, said strips being non-contiguous, a plurality of magnetic circuits, each positioned on said sheet at the gap between two of said conductive strips, and a plurality of U-shaped conductors secured at each end to one of said strips, each of said U-shaped conductors bridging one of said gaps by entering into two of said perforations, and each linking one of said magnetic circuits whereby to secure said circuits to said sheet and to form a series electrical conductive path linking a row of said magnetic circuits.

References Cited in the file of this patent

UNITED STATES PATENTS

| | | |
|---|---|---|
| 2,353,061 | Oldenboom | July 4, 1944 |
| 2,581,967 | Mitchell | Jan. 8, 1952 |
| 2,667,542 | Wright | Jan. 26, 1954 |